United States Patent
Cook

Patent Number: 5,979,912
Date of Patent: Nov. 9, 1999

[54] HEAVY-METAL SHRINK FIT CUTTING TOOL MOUNT

[76] Inventor: Harold D. Cook, 33642 Via Martos, Dana Point, Calif. 92629

[21] Appl. No.: 08/890,225

[22] Filed: Jul. 9, 1997

[51] Int. Cl.⁶ .................................................. B24B 41/00
[52] U.S. Cl. .................... 279/102; 408/144; 408/239 A; 408/226; 76/108.6; 76/108.1; 76/102; 76/103
[58] Field of Search ................................. 408/144, 238, 408/239 R, 239 A, 226; 279/102; 76/108.6, 108.1, 102, 103

[56] References Cited

U.S. PATENT DOCUMENTS

| | | | |
|---|---|---|---|
| 1,285,589 | 11/1918 | Barnes | 76/108.6 |
| 1,404,016 | 1/1922 | Engelbrekt . | |
| 1,409,753 | 3/1922 | Moore . | |
| 1,539,413 | 5/1925 | Fish . | |
| 1,658,504 | 2/1928 | Weiss . | |
| 1,936,498 | 11/1933 | Corbett | 76/108 |
| 1,994,792 | 3/1935 | Sanderson | 255/63 |
| 2,125,005 | 7/1938 | Jearum | 29/96 |
| 2,161,062 | 6/1939 | Killgore | 262/33 |
| 2,374,919 | 5/1945 | Bruseth | 90/11 |
| 2,729,458 | 1/1956 | Sacrey | 279/41 |
| 2,860,547 | 11/1958 | Stephan | 90/11 |
| 2,893,291 | 7/1959 | Hollis | 90/11 |
| 2,913,935 | 11/1959 | Flannerty et al. | 77/58 |
| 2,918,290 | 12/1959 | Werstein | 279/19 |
| 2,920,913 | 1/1960 | Antila | 287/119 |
| 2,942,891 | 6/1960 | Zale | 279/1 |
| 3,053,118 | 9/1962 | Lavallee . | |
| 3,221,404 | 12/1965 | Averill et al. | 29/568 |
| 3,307,243 | 3/1967 | Andreasson | 29/106 |
| 3,372,951 | 3/1968 | McCash | 287/91 |
| 3,397,615 | 8/1968 | Meinke | 90/11 |
| 3,424,055 | 1/1969 | Rollat | 90/11 |
| 3,557,419 | 1/1971 | Flannery | 29/105 |
| 3,678,632 | 7/1972 | Eversole et al. | 76/108.1 |
| 3,734,515 | 5/1973 | Dudek | 279/1 A |
| 3,807,804 | 4/1974 | Kniff | 299/91 |
| 3,937,587 | 2/1976 | Lindem et al. | 408/181 |

(List continued on next page.)

FOREIGN PATENT DOCUMENTS

| | | | |
|---|---|---|---|
| 0026751 | 11/1981 | European Pat. Off. | 279/11 S |
| 382079B1 | 8/1993 | European Pat. Off. . | |
| 575 009 | 12/1925 | Germany . | |
| 662704 | 6/1938 | Germany . | |
| 1008085 | 5/1957 | Germany . | |
| 1 008 085 | 10/1957 | Germany . | |
| 2229374 | 1/1974 | Germany | 279/1 A |
| 2759007 | 8/1978 | Germany | 408/239 A |
| 2811977 | 9/1979 | Germany . | |
| 3925641C2 | 9/1992 | Germany . | |
| 5316976 | 2/1978 | Japan | 279/1 A |
| 57-107710 | 5/1982 | Japan | 279/9.1 |
| 551065 | 2/1942 | United Kingdom . | |
| 729295 | 5/1955 | United Kingdom . | |
| 921522 | 3/1963 | United Kingdom . | |
| 1319200 | 6/1973 | United Kingdom . | |
| 2137124 | 10/1984 | United Kingdom | 279/7 |

OTHER PUBLICATIONS

MI–Tech Metals, Inc., "High Density Tungsten Based Metals" 4 pages.

*Primary Examiner*—Daniel W. Howell
*Assistant Examiner*—Mark T. Henderson
*Attorney, Agent, or Firm*—Stetina Brunda Garred & Brucker

[57] ABSTRACT

A mount for interfacing a cutting tool having a generally cylindrical shank portion to a tool holder having a central opening. The mount comprises an elongate, generally cylindrical shank member having first and second ends. The first end is insertable into and securable within the central opening of the tool holder, with the second end including an axially extending bore disposed therein. The shank member is formed to have an outer diameter which slightly exceeds the diameter of the central opening of the tool holder. The bore itself is formed to have a diameter which is slightly less than the diameter of the shank portion of the cutting tool.

2 Claims, 1 Drawing Sheet

U.S. PATENT DOCUMENTS

| | | | |
|---|---|---|---|
| 3,945,752 | 3/1976 | Bennett | 408/146 |
| 3,989,260 | 11/1976 | Zonkov et al. | 279/4 |
| 3,994,615 | 11/1976 | Narang | 408/226 |
| 4,021,051 | 5/1977 | Toyomoto et al. | 279/1 N |
| 4,099,889 | 7/1978 | Vig | 408/239 R |
| 4,133,545 | 1/1979 | Komori | 279/83 |
| 4,226,562 | 10/1980 | Schmid et al. | 409/233 |
| 4,251,113 | 2/1981 | Mitin et al. | 299/69 |
| 4,274,774 | 6/1981 | Haga et al. | 409/232 |
| 4,453,775 | 6/1984 | Clemmow | 299/81 |
| 4,619,564 | 10/1986 | Jacobson | 408/146 |
| 4,668,138 | 5/1987 | Carter | 409/234 |
| 4,795,292 | 1/1989 | Dye | 409/136 |
| 4,808,049 | 2/1989 | Cook | 409/234 |
| 4,818,161 | 4/1989 | Cook | 409/233 |
| 4,934,743 | 6/1990 | Kapgan et al. | 285/23 |
| 4,971,491 | 11/1990 | Cook | 409/131 |
| 5,048,375 | 9/1991 | Kobayashi | 76/108 |
| 5,277,435 | 1/1994 | Kramer et al. | 2779/9.1 |
| 5,280,671 | 1/1994 | Uwe . | |
| 5,311,654 | 5/1994 | Cook | 29/447 |
| 5,582,494 | 12/1996 | Cook | 409/234 |

HEAVY-METAL SHRINK FIT CUTTING TOOL MOUNT

FIELD OF THE INVENTION

The present invention relates generally to machine tools, and more particularly to a heavy-metal mount for interfacing a cutting tool to a tool holder through the use of heat shrink fitting techniques.

BACKGROUND OF THE INVENTION

As is well known, various tool holders have been utilized in the prior art which interface with a rotating spindle of a machine such as a milling or boring machine to securely hold a cutting tool upon the machine during the cutting of a work piece. In most prior art tool holders, a central aperture is formed therein for receiving the shank portion of the cutting tool which is to be interfaced to the milling or other machine. Subsequent to the insertion of the shank portion of the cutting tool into the central aperture, the tool holder is drawn or pulled tightly into the spindle so as to rigidly maintain the cutting tool within the tool holder.

In certain machining applications, it is necessary to use what is commonly referred to as a "long reach" cutting tool which comprises an elongate, extended shank portion having a cutting head disposed on one end thereof. The end of the shank portion opposite that including the cutting head is inserted into the central aperture and rigidly maintained within the tool holder when the tool holder is drawn into the spindle of the milling or other machine. As is well known, cutting tools, including those of the long reach variety, are typically fabricated from tungsten carbide due to its extremely high level of hardness. However, though being extremely hard, tungsten carbide is also brittle. In this respect, when a long reach cutting tool is used in high speed and other milling applications and an excessive mount of shear force is applied to the cutting head thereof, there is a tendency for the shank portion of the cutting tool to fracture in view of the brittleness of the tungsten carbide material used to fabricate the cutting tool. As will be recognized, such catastrophic failure of the cutting tool poses the threat of causing serious injury to the machine operator.

Additionally, a significant deficiency associated with the prior art tool holders themselves is that the manner in which the shank portion of the cutting tool is secured within the central aperture of the tool holder often results in the non-concentric mounting of the cutting tool within tool holder. Such non-concentric mounting is extremely undesirable, particularly in modern, high tolerance machining applications such as those performed on a vertical milling machine wherein minor variations in the concentricity of the cutting tool within the tool holder often times results in extreme flaws in the cutting operation.

The present invention addresses the deficiencies of prior art long reach cutting tools and tool holders by providing a mount or extension which is adapted to interface a tungsten carbide cutting tool to a tool holder and is significantly less susceptible to fracture. The mount of the present invention is also constructed to substantially eliminate the non-concentric mounting of the cutting tool relative to the tool holder by facilitating the interface of the cutting tool to the tool holder through the use of heat shrink fitting techniques.

SUMMARY OF THE INVENTION

In accordance with the present invention, there is provided an extension or mount for interfacing a cutting tool to a tool holder. The mount is preferably used in conjunction with cutting tools having generally cylindrical shank portions and tool holders which define a central aperture or opening having a generally circular cross-sectional configuration. The mount comprises an elongate, generally cylindrical shank member having first and second ends. The first end of the shank member is insertable into and securable within the central opening of the tool holder, with the second end including an axially extending bore disposed therein. Like the central opening of the tool holder, the bore of the shank member has a generally circular cross-sectional configuration.

In the preferred embodiment, the shank member is formed to have an outer diameter which slightly exceeds the diameter of the central opening of the tool holder. Additionally, the bore of the shank member is formed to have a diameter which is slightly less than the shank portion of the cutting tool. The shank member is preferably fabricated from a material which is less brittle than the material used to form the shank portion of the cutting tool. The shank portion of the cutting tool preferably used in conjunction with the extension of the present invention is fabricated from a heavy metal (e.g., tungsten alloys such as high density tungsten based metals), with the cutting head thereof being fabricated from tungsten carbide, ceramic, or high speed metal. If both the shank portion and the cutting head of the cutting tool are fabricated from the same material, the cutting tool typically comprises a unitary structure. If, however, the shank portion and the cutting head are fabricated from different materials, the cutting head is attached to the shank portion via a brazing or similar process. The shank member itself is preferably fabricated from tungsten carbide.

Further in accordance with the present invention, the mount is used to interface the cutting tool to the tool holder by initially heating the tool holder to a temperature sufficient to thermally increase the diameter of the central opening to a size allowing the first end of the shank member to be slidably inserted to a desired axial position therein. Thereafter, the tool holder is allowed to cool to ambient temperature to cause a thermal contraction of the central opening about the shank member to rigidly secure the shank member within the tool holder. The shank member itself is then heated to a temperature sufficient to thermally increase the diameter of the bore to a size allowing the shank portion of the cutting tool to be slidably inserted to a desired axial position therein. The shank member is then allowed to cool to ambient temperature to cause a thermal contraction of the bore about the shank portion to rigidly secure the cutting tool within the shank member. It will be recognized that the shank portion of the cutting tool may be heat shrunk within the shank member in the aforementioned manner prior to the shank member being heat shrunk within the tool holder.

BRIEF DESCRIPTION OF THE DRAWINGS

These, as well as other features of the present invention, will become more apparent upon reference to the drawings wherein.

DETAILED DESCRIPTION OF THE PREFERRED EMBODIMENT

Figure 1:
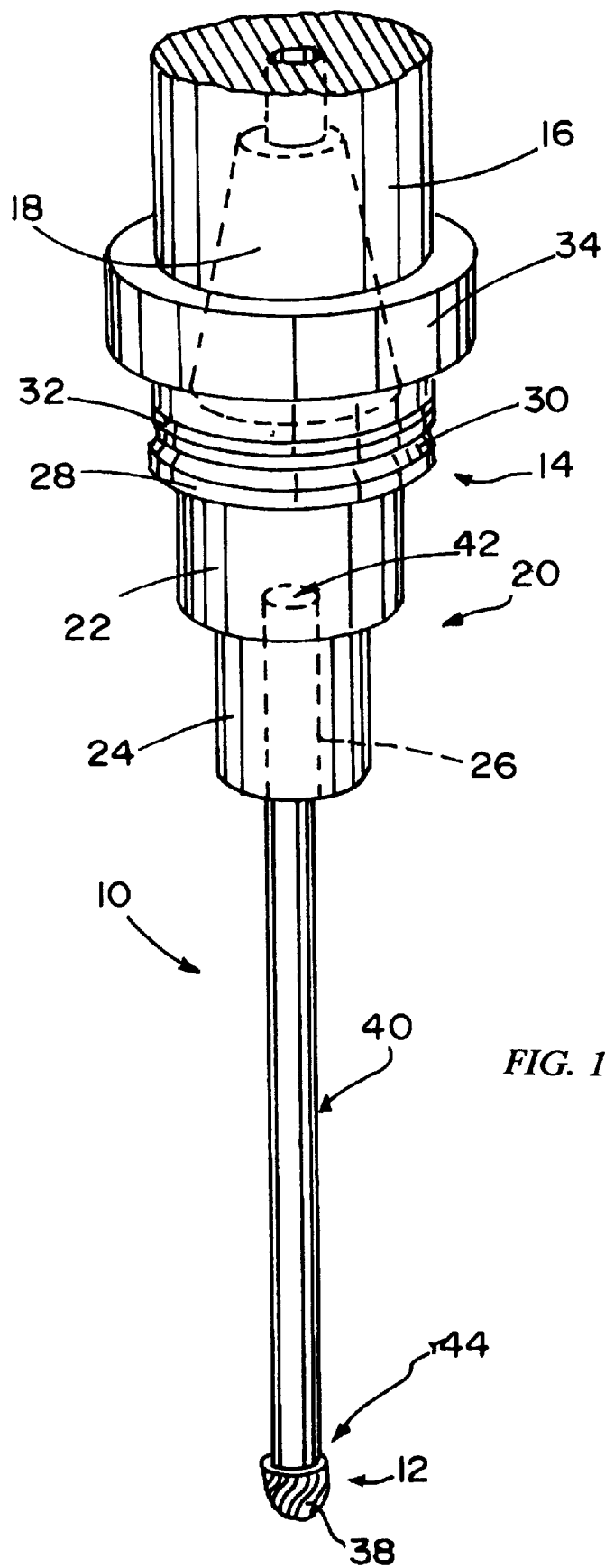
FIG. 1 is a perspective view of the mount constructed in accordance with the present invention, illustrating the manner in which the mount is used to interface a cutting tool to a tool holder.

Referring now to the drawings wherein the showings are for purposes of illustrating a preferred embodiment of the present invention only, and not for purposes of limiting the same, FIG. 1 perspectively illustrates an extension or mount 10 which is adapted to interface a cutting tool 12 to a tool holder 14 through the use of heat shrink fitting techniques. As will be discussed in more detail below, the combination of the mount 10 and cutting tool 12 is structurally similar to what is commonly referred to as a "long reach" cutting tool, except that such combination is significantly less susceptible to catastrophic failure when a shear force is applied to the cutting tool 12 during a high speed or other milling application.

The tool holder 14 with which the mount 10 is utilized is itself adapted for use in the rotating spindle 16 of a machine such as a milling machine or a boring machine. The tool holder 14 comprises a conically tapered shank portion 18 which is adapted to be inserted into a complementary recess within the spindle 16. In this respect, the slope of the inner surface of the recess corresponds to the slope of the outer surface of the shank portion 18, with the shank portion 18 being firmly seated within the recess when the tool holder 14 is properly secured to the spindle 16. Typically, the tool holder 14 is secured to the spindle 16 by drawing the shank portion 18 upwardly into the recess.

In addition to the shank portion 18, the tool holder 14 comprises a cutting tool mounting portion 20 which includes a cylindrically configured upper section 22 and a cylindrically configured lower section 24. The lower section 24 extends axially from the upper section 22 and has an outer diameter which is less than that of the upper section 22 such that an annular shoulder is defined between the upper and lower sections 22, 24. Extending axially within the lower section 24 of the mounting portion 20 is a central opening 26 which has a generally circular cross-sectional configuration and is adapted to receive the mount 10 in a manner which will be described in more detail below. Though not shown, it will be recognized that the mounting portion 20 of the tool holder 14 may be of uniform diameter rather than including the differently sized upper and lower sections 22, 24.

In addition to the shank and mounting portions 18, 20, the tool holder 14 comprises a circularly configured flange portion 28 which is formed between the shank portion 18 and the upper section 22 of the mounting portion 20. The flange portion 28 extends radially outward relative to the shank portion 18 and upper section 22, and includes a generally V-shaped slot 30 disposed within the peripheral edge thereof and extending circumferentially thereabout. The slot 30 is adapted to accommodate a tool holder changer (not shown) to carry and contact the tool holder 14 for automatic removal and insertion of the tool holder 14 from and into the spindle 16. The tool holder is typically fabricated from tool steel or alloy steel. Those skilled in the art will recognize that the tool holder 14 bears general similarity to standard tool holder dimensional configurations such as the American Standard, Japanese B.T., European B.N., and Caterpillar V-shaped Flange Standard.

The tool holder 14 further comprises an annular, ring-like dampening member 32 which is disposed upon the upper surface of the flange portion 28 and extends about (i.e., circumvents) the base of the shank portion 18. The dampening member 32 is sized such that when positioned in the aforementioned manner, the inner edge thereof either contacts or is disposed in extremely close proximity to the base of the shank portion 18, and the outer edge thereof is substantially flush with the peripheral edge of the flange portion 28. The dampening member 32 is preferably fabricated from a compressible material, and more particularly an elastomeric material.

As seen in FIG. 1, with the dampening member 32 being operatively positioned upon the upper surface of the flange portion 28, the shank portion 18 of the tool holder 14 is inserted into the recess of the spindle 16 such that the dampening member 32 contacts both the flange portion 28 and the spindle 16. When the shank portion 18 is drawn or pulled into the recess for purposes of rigidly securing the tool holder 14 to the spindle 16, the dampening member 32, due to its fabrication from an elastomeric material, is compressed between the flange portion 28 and the spindle 16, thus causing its outer edge to bulge outwardly relative to the peripheral edge of the flange portion 28 and the outer surface of the spindle 16. The advantages attendant to the configuration of the tool holder 14, and in particular the dampening member 32 thereof, in relation to the use of the mount 10 will also be discussed in more detail below.

As further seen in FIG. 1, the tool holder 14 is preferably used in combination with an annular compression ring 34 which is extensible about the outer surface of the spindle 16. When secured to (i.e., compressed about) the spindle 16, the compression ring 34 assists in maintaining the shank portion 18 of the tool holder 14 firmly seated within the recess of the spindle 16 by ensuring a proper fit between the complementary tapers of the outer surface of the shank portion 18 and the inner surface of the spindle 16 defining the recess. In this respect, the compression ring 34 prevents these corresponding tapered surfaces from opening up and loosening the tool holder 14 within the spindle 16. The compression ring 34 is preferably fabricated from a composite material. Additionally, the compression ring is preferably secured to the spindle 16 via a shrink fitting process. In this respect, the inner diameter of the compression ring 34 is sized to normally be slightly smaller than the outer diameter of the spindle 16. The cooling of the spindle 16 facilitates the thermal contraction thereof from a first outer diameter to a reduced second outer diameter. Such thermal contraction of the spindle 16 allows the compression ring 34 to be slidably advanced over the outer surface thereof. The subsequent return of the spindle 16 to ambient temperature facilitates the thermal expansion thereof from its reduced second outer diameter back to its first outer diameter. Such thermal expansion of the spindle 16 results in the compression of the compression ring 34 about the outer surface thereof.

Figure 2:
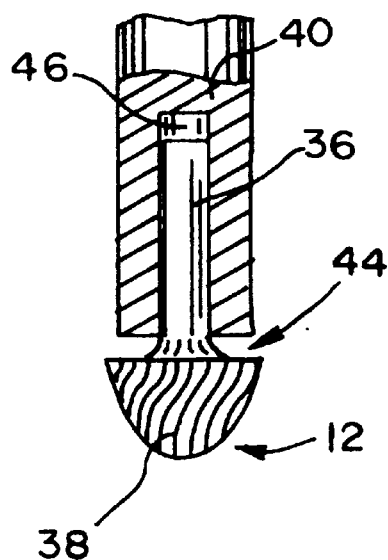
FIG. 2 is a partial cross-sectional view of the distal end of the mount, illustrating the manner in which the cutting tool is secured therewithin.

Referring now to FIGS. 1 and 2, the cutting tool 12 with which the mount 10 of the present invention is preferably utilized comprises a generally cylindrical shank portion 36 which is preferably fabricated from a heavy metal (e.g., tungsten alloys such as high density tungsten based metals). Attached to one end of the shank portion 36 is a cutting head 38. As shown in FIG. 2, the cutting head 38 is attached to the shank portion 36 via a brazing process, and is preferably formed from a material different from that used to form the shank portion 36, e.g., tungsten carbide, ceramic, or high speed metal. However, those of ordinary skill in the art will recognize that the shank portion 36 and cutting head 38 may be fabricated from the same material, and that the shank portion 36 and cutting head 38 may comprise a unitary structure, rather than separate elements attached to each other via a brazing process. Importantly, it is contemplated that the shank portion 36 of the cutting tool 12 used in conjunction with the extension 10 of the present invention will be fabricated from a metal which possesses low thermal expansion/contraction properties.

The mount 10 constructed in accordance with the present invention itself comprises an elongate, cylindrically configured shank member 40 having a first end 42 and a second end 44. The first end 42 of the shank member 40 is insertable into and securable within the central opening 26 of the tool holder 14 in a manner which will be described in more detail below. As best seen in FIG. 2, the second end 44 of the shank member 40 includes an axially extending bore 46 disposed therein which has a generally circular cross-sectional configuration. The shank portion 36 of the cutting tool 12 is insertable into and securable within the bore 46 of the shank member 40 in a manner which will also be described in more detail below.

In the mount 10 of the present invention, the shank member 40 is formed to have an outer diameter which slightly exceeds the diameter of the central opening 26 of the tool holder 14. Additionally, the bore 46 of the shank member 40 is formed to have a diameter which is slightly less than the diameter of the shank portion 36 of the cutting tool 12. More particularly, the diameter of the central opening 26 of the tool holder 14 is about 0.0003 to 0.001 inches less than the outer diameter of the shank member 40, with the diameter of the bore 46 of the shank member 40 being about 0.0003 to 0.001 inches less than the diameter of the shank portion 36 of the cutting tool 12.

As previously indicated, the shank portion 36 of the cutting tool 12 used with the mount 10 is typically fabricated from a heavy metal. The shank member 40 is itself preferably fabricated from tungsten carbide which has thermal expansion/contraction properties superior to those of the heavy metal used to form the shank portion 36 of the cutting tool 12. In selecting the material for the shank member 40, it is preferred that any selected material will be less brittle than the material used to form the shank portion 36 of the cutting tool 12.

The mount 10 of the present invention is used to interface the cutting tool 12 to the tool holder 14 by initially heating the mounting portion 20 of the tool holder 14 to a temperature sufficient to thermally increase the diameter of the central opening 26 to a size allowing the first end 42 of the shank member 40 to be slidably inserted to a desired axial position therein. Thereafter, the mounting portion 20 of the tool holder 14 is allowed to cool to ambient temperature for purposes of causing a thermal contraction of the central opening 26 about the shank member 40 to rigidly secure the shank member 40 within the tool holder 14. In this respect, the thermal contraction of the central opening 26 results in a metal-to-metal press fit between the portion of the shank member 40 adjacent the first end 42 and the mounting portion 20 of the tool holder 14.

Subsequent to the shank member 40 being rigidly secured to the tool holder 14 in the aforementioned manner, the portion of the shank member 40 adjacent the second end 44 thereof is heated to a temperature sufficient to thermally increase the diameter of the bore 46 to a size allowing the shank portion 36 of the cutting tool 12 to be slidably inserted to a desired axial position therein. The depth of the bore 46 is preferably sized relative to the length of the shank portion 36 such that a slight gap is defined between the shank portion 36 and the closed end of the bore 46 when the shank portion 36 is fully inserted into the bore 46. Subsequent to the shank portion 36 being slidably inserted into the bore 46, the shank member 40 is allowed to cool to ambient temperature for purposes of causing a thermal contraction of the bore 46 about the shank portion 36 to rigidly secure the cutting tool 12 within the shank member 40. In this respect, the thermal contraction of the bore 46 results in a metal-to-metal press fit between the portion of the shank member 40 adjacent the second end 44 and the shank portion 36 of the cutting tool 12.

The heating of the mounting portion 20 of the tool holder 14 and the shank member 40 is typically accomplished through the use of an induction heater, though it will be recognized that alternative heating methods may also be employed in relation to the use of the mount 10 of the present invention. Additionally, though the shank member 40 is described as being secured to the tool holder 14 via the heat shrinking process prior to the cutting tool 12 being secured to the shank member 40 via the same process, it will be recognized that these heat shrinking steps can be conducted in a reverse order, i.e., the cutting tool 12 may be secured to the shank member 40 prior to the shank member 40 being secured to the tool holder 14. Moreover, though not shown, the shank member 40 may have alternative configurations, so long as a sufficient portion thereof adjacent the first end 42 is cylindrically configured, i.e., has a generally circular cross-sectional configuration. The removal of the shank member 40 from the tool holder 14 is conducted in a reverse manner, i.e., by heating the mounting portion 20 so as to thermally increase the diameter of the central opening 26 to allow the first end 42 of the shank member 40 to be removed from therewithin. Similarly, the removal of the cutting tool 12 from the shank member 40 is accomplished by heating the shank member 40 so as to thermally expand the diameter of the bore 46 for allowing the shank portion 36 of the cutting tool 12 to be removed from therewithin.

Advantageously, the use of the heat shrinking processes/ techniques to rigidly maintain the shank member 40 within the tool holder 14 and the cutting tool 12 within the shank member 40 facilitates the interface of the cutting tool 12 to the spindle 16 in a concentric fashion for high tolerance machining applications. In this respect, the use of the heat shrinking processes substantially prevents the non-concentric mounting of the shank member 40 within the tool holder 14 and the cutting tool 12 within the shank member 40 in view of the uniform engagement between the inner surface of the mounting portion 20 defining the central opening 26 and the outer surface of the shank member 40, and the uniform engagement between the inner surface of the shank member 40 defining the bore 46 and the outer surface of the shank portion 36 of the cutting tool 12.

As previously indicated, the combination of the mount 10 (i.e., shank member 40) and cutting tool 12 is structurally similar to a "long reach" cutting tool. As explained above, long reach cutting tools include elongate, extended shank portions, and are used in specialized cutting applications. Advantageously, the use of the shank member 40 which is preferably formed from a material less brittle than that used to form the shank portion 36 of the cutting tool 12 provides the structural equivalent of a long reach cutting tool, with substantially less susceptibility to the fracturing or other catastrophic failure of the shank member 40 due to the preferred materials used for the fabrication thereof. In this respect, if the material used to form the shank member 40 is substantially less brittle than the material used to form the shank portion 36 of the cutting tool 12, the shank member 40 is less susceptible to failure when a shear force is applied to the cutting head 38 of the cutting tool 12 during a high speed milling application.

It is also known that when long reach cutting tools are used in high speed milling applications, there is a tendency for a harmonic resonance to be generated by the shank portion of the cutting tool and transferred into the tool holder. Since the combination of the shank member 40 and the cutting tool 12 is structurally equivalent to a long reach cutting tool, the tool holder 14 with which the mount 10 of the present invention is preferably used is specifically adapted to eliminate such harmonic resonance which could be transferred into the tool holder 14 by the shank member 40 during a high speed milling application. In this respect, the compression of the dampening member 32 in the previously described manner effectively dampens and thus substantially eliminates any harmonic resonance transferred into the tool holder 14 by the cutting tool 12 via the shank member 40. The dampening of such harmonic resonance prevents slight movements of the cutting tool 12 relative to the tool holder 14 which could cause cuts made by the cutting head 38 to be substantially out of tolerance or, in extreme cases, could result in the loosening of the tool holder 14 within the spindle 16.

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention.

What is claimed is:

1. A method of interfacing a cutting tool which includes a generally cylindrical shank portion formed from a first material having a first coefficient of thermal expansion to a tool holder which includes a central opening and is formed from a second material having a second coefficient of thermal expansion, the method comprising the steps of:

(a) providing an elongate, generally cylindrical shank member formed from a third material having a third coefficient of thermal expansion which exceeds the first coefficient of thermal expansion but is less than the second coefficient of thermal expansion, and having an outer diameter which slightly exceeds the diameter of the central opening, a first end, and a second end including an axially extending bore therein which is of a diameter slightly less than the diameter of the shank portion of the cutting tool;

(b) heating the tool holder to a temperature sufficient to thermally increase the diameter of the central opening to a size allowing the first end of the shank member to be slidably inserted to a desired axial position therein;

(c) allowing the tool holder to cool to ambient temperature to cause a thermal contraction of the central opening about the shank member to rigidly secure the shank member within the tool holder;

(d) heating the shank member to a temperature sufficient to thermally increase the diameter of the bore to a size allowing the shank portion of the cutting tool to be slidably inserted to a desired axial position therein; and (e) allowing the shank member to cool to ambient temperature to cause a thermal contraction of the bore about the shank portion to rigidly secure the cutting tool within the shank member.

2. The method of claim 1 wherein step (a) comprises selecting the third material used to form the shank member to be less brittle than the first material used to form the shank portion of the cutting tool.

* * * * *